United States Patent [19]

Walker

[11] Patent Number: 4,492,136

[45] Date of Patent: Jan. 8, 1985

[54] CUTTING ASSEMBLY SYSTEM FOR PIPE CASINGS AND THE LIKE

[76] Inventor: Ronald I. Walker, 2411 White St., Mobile, Ala. 36605

[21] Appl. No.: 331,977

[22] Filed: Dec. 18, 1981

[51] Int. Cl.³ .............................................. B26D 7/08
[52] U.S. Cl. ......................................... 83/169; 30/97;
30/101; 51/33 R; 51/241 B; 83/54; 83/170;
83/428; 83/453; 83/490; 144/34 R; 144/355;
144/379
[58] Field of Search ................... 83/54, 170, 169, 428,
83/490, 453, 928; 30/93, 97, 101, 102, 379.5;
51/33 R, 90, 241 B; 144/34 R, 34 E, 355, 379

[56] References Cited

U.S. PATENT DOCUMENTS

| | | | |
|---|---|---|---|
| 2,170,255 | 8/1939 | Sheperdson | 83/490 |
| 2,769,235 | 11/1956 | Martois | 30/97 |
| 2,851,773 | 9/1958 | Jennison | 30/101 |
| 3,224,146 | 12/1965 | Ahlström | 51/101 |
| 3,915,209 | 10/1975 | Denis | 83/928 |
| 4,185,525 | 1/1980 | Sherer | 30/97 |

Primary Examiner—Frank T. Yost
Assistant Examiner—Hien H. Phan
Attorney, Agent, or Firm—C. Emmett Pugh & Associates

[57] ABSTRACT

A cutter system for pipe casings and the like, including a generally "C" shaped cutter assembly body having an always open side entry and exit area leading into the centrally located cutter area with an annular trackway extending an exemplary 290° about the operative center of the cutter system. A cutter sub-assembly is carried on the trackway for back and forth movement of an exemplary 110° in each direction with the sub-assembly carrying two, directly opposed rotating cutter blades which cut the pipe casing as the sub-assembly is moved to and from on the trackway. The two blades travel in each direction a minimum of one-half their arcuate spacing difference and preferably less than their arcuate spacing difference, producing a full 360° cut. The cutters are radially moved in and out by a reciprocating yoke assembly. The cutter body assembly is pivotally mounted onto a telescoping boom attached to for example a work vehicle. An automatic pipe clamp, centering system is included, and all the operative elements are pneumatically or hydraulically driven in association with water cooling lines.

9 Claims, 6 Drawing Figures

CUTTING ASSEMBLY SYSTEM FOR PIPE CASINGS AND THE LIKE

BACKGROUND OF THE INVENTION

1. Field of Invention

The present invention relates to cutters of objects which are at least generally circular in cross-sectional area and in which the cutter blade(s) moves with respect to the object, and more particularly, in its most preferred embodiment, to a cutter assembly system for pipe casings and the like.

2. Prior Art

There is a large body of prior patent art directed to various types of cutters for pipes.

A collection of prior patents disclosing various pipe cutters in which there are one or more moveable cutters which move about the pipe for the cutting thereof is presented below:

| Patentee(s) | Patent No. | Issue Date |
| --- | --- | --- |
| A. W. Shaw, et al | 2,842,238 | May 18, 1956 |
| J. E. Jennison | 2,851,773 | June 21, 1957 |
| A. McIver | 2,697,875 | Dec. 28, 1954 |
| W. E. Shultz | 3,249,998 | May 10, 1966 |
| L. K. Bridges, et al | 3,290,779 | Dec. 13, 1966 |
| J. A. Berberian, et al | 3,456,856 | July 22, 1969 |
| Duck, et al | 3,720,260 | March 13, 1973 |
| Sherer, et al | 3,807,047 | Apr. 30, 1974 |
| Sherer | 4,185,525 | Jan. 29, 1980 |

In these prior art devices the cutter assembly is mounted about the pipe to be cut, completely encircling and enclosing the pipe about a total of 360°. In one instance, the Duck et al patent ('260), the cutter assembly is permanently mounted about the pipe string.

More typically, the prior art comprises temporarily mounted tools which encircle and enclosed the pipe for the complete 360°, requiring some sort of "gate" type structure to allow entry and removal of the pipe from the pipe cutting area.

For example, in the Jennison ('773) and Shaw et al ('238) patents the cutter is dividable into separable, 180° parts which are assembled, joined and clamped together about the pipe during the cutting operation, and the process reversed in order to prepare the tool for the next pipe to be cut.

The Bridges et al ('779), McIver ('875), the Berberian et al ('856), Sherer et al ('525), Shultz ('998) and the Sherer et al ('047) patents use hinged sections which are moveable apart and together to open and close the cutter assembly about the pipe to be cut.

In most of the foregoing prior art the mountings for the cutter blade(s) are fixed to the basic assembly body and the entire cutter assembly (body and blades) moved about the pipe during the cutting operation.

In two of the foregoing prior art devices, the cutter blade mounting is moveably carried by the cutter assembly body and rides on a trackway with the body assembly being clamped to the pipe being cut. The moveably mounted cutter then travels 360° on the trackway completely about the assembly body affixed to the pipe.

Thus the prior art approaches have required relatively cumbersome and complex assemblies to allow for the entry and removal of the object to be cut, and either required that either the entire assembly with its fixed cutter mountings be moved about the pipe or that the assembly be affixed to the pipe using a single, moveable cutter travelling the complete 360° about the pipe on a trackway.

Thus, inter alia, all of these foregoing prior art cutter tool patents require a base assembly type structure which has a moveable gate type element to allow for the entry and removal of the pipe or other object being cut from within the encircling base assembly before and after the cutting process, respectively.

In contrast, the present invention utilizes a relatively simple, straight forward structure and approach in which the base assembly always has an open entry and exit area without the need for a moveable gate element and includes at least two moveable cutters annularly traveling on a trackway, neither of which move their arcuate separation distance and each of which moves at least a little over half their arcuate separation distance.

3. SUMMARY DISCUSSION OF PRESENT INVENTION

In contrast to the prior art, the cutting system of the present invention includes in its preferred embodiment an open, generally "C" shaped cutter assembly body or yoke which always has an open, side entry or exit portion to allow easy access and instantaneous removal of the object being cut from the centrally located cutting area. Moveably mounted on the assembly body are at least two, opposed cutting members moveably mounted for annular or circular movement about the centrally located cutting area on the assembly body.

The cutters from their central, "neutral" position move at least a little over half their arcuate separation distance but less than their separation distance in each direction.

There are preferably two, directly opposed cutters, separated from each other by 180° located on opposite sides of the open, side, entry/exit portion. These two cutters move from their central, neutral position at least a little over 90° in one direction (for example counter-clockwise), and at least a little over 90° in the other direction (for example clockwise), the two cutters thus contacting and cutting the pipe over a complete 360° to complete the cut. In the particular, preferred, exemplary embodiment described herein, the cutters are moved an exemplary 110° in each direction.

The cutter assembly can be mounted for example on a boom attached to a work vehicle, and the cutter assembly body is held stationary during the cutting operation, as the mounted cutters move on the trackway located on the assembly body.

Such an arrangement allows the cutter system of the present invention to be quickly and easily positioned about the pipe casing to be cut, for the pipe to be cut, and for the system to be moved on to the next object to be cut, all without any undue delay or need for assembling or disassembling the cutter assembly body about the object.

Additionally, the cutter system of the present invention allows relatively remote control as compared to the prior art designs which are locally, directly operated.

DETAILED DESCRIPTION OF THE PREFERRED EMBODIMENT

Figure 1:
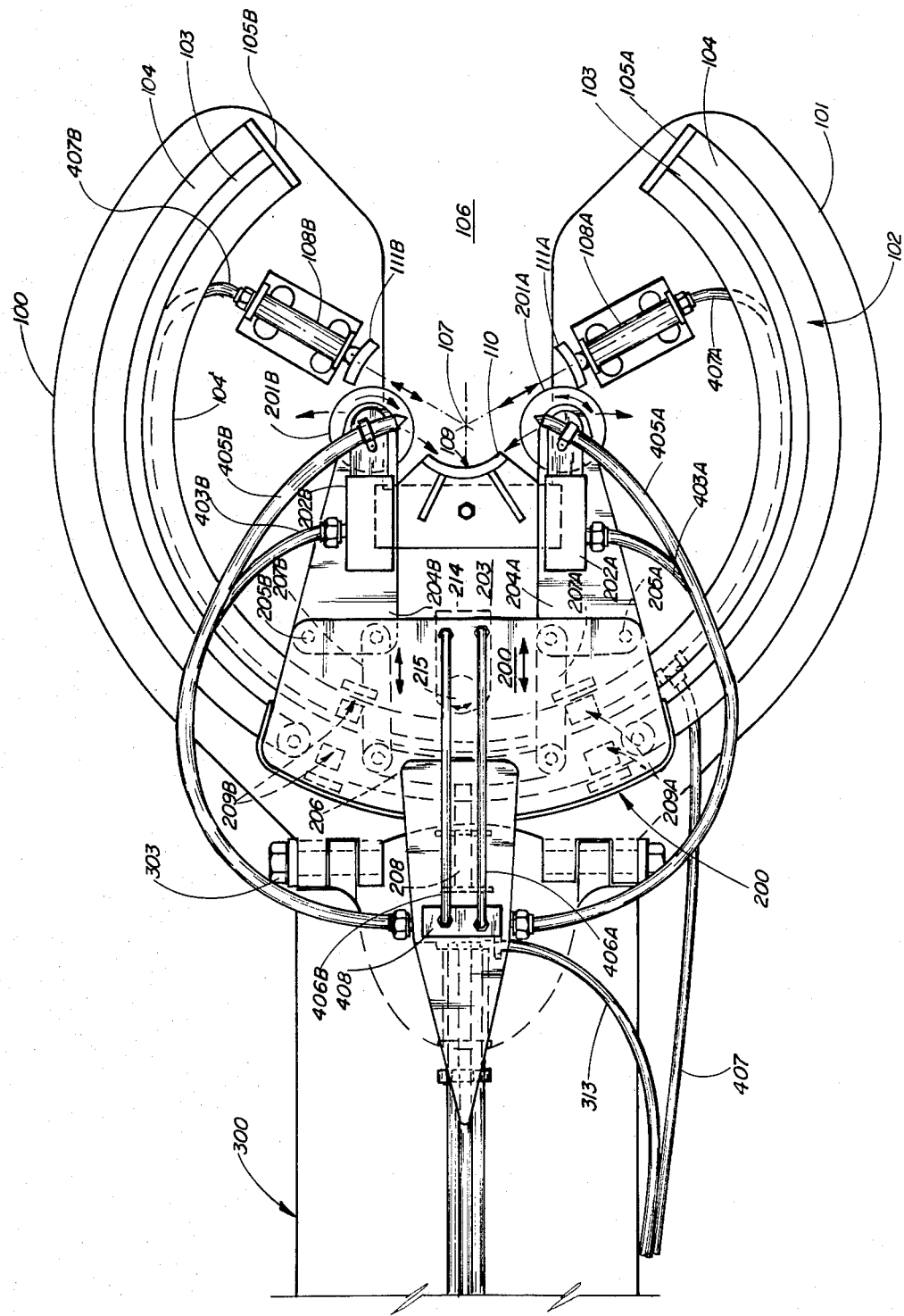
Figure 2:
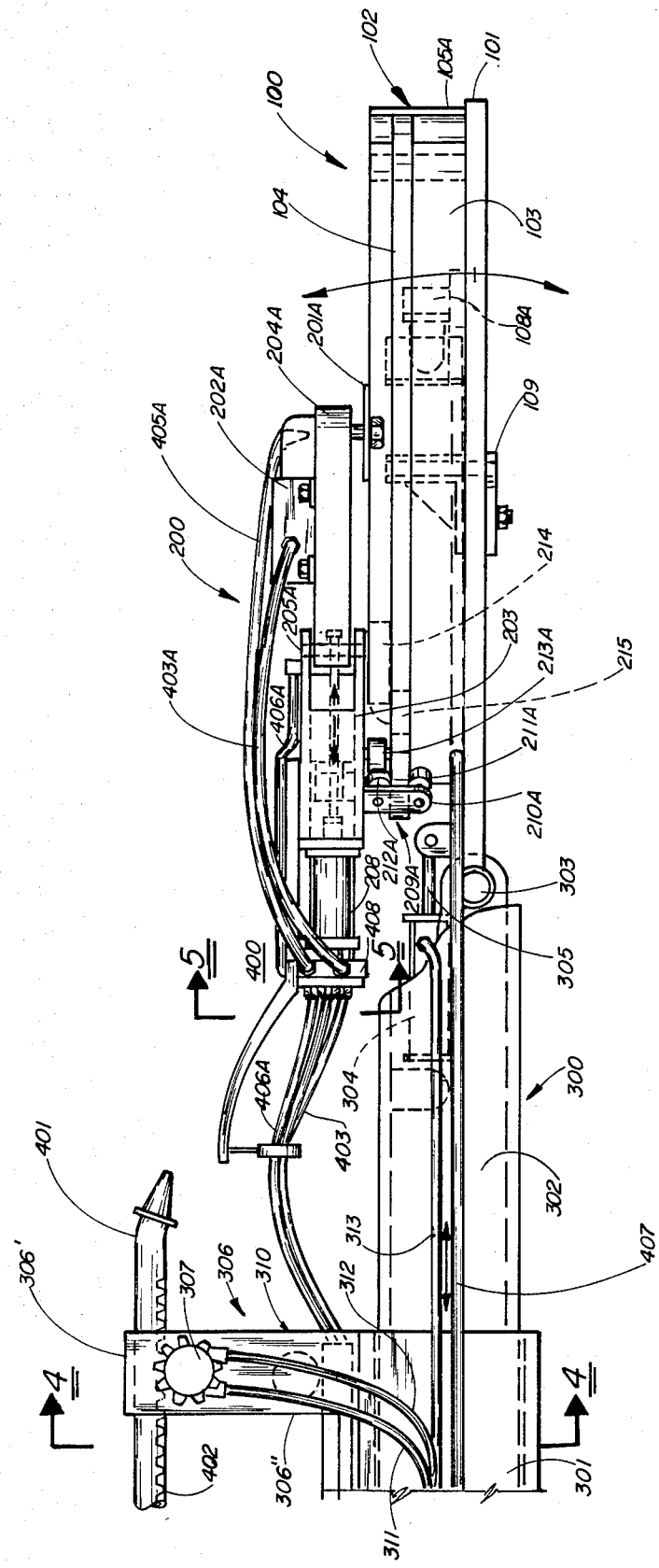

The preferred, exemplary embodiment of the cutter assembly system of the present invention is illustrated in general, over-all views in FIGS. 1 and 2, with close-up, detailed views being presented in FIGS. 3–6. The preferred, exemplary embodiment of the cutter assembly system comprises four major components, the cutter assembly body 100, the moveable cutter sub-assembly 200, the boom section 300, and the control and accessory equipment systems 400, and each will now be described.

The cutter assembly body 100 includes a horizontally-disposed, generally "C" shaped, steel base plate 101, upon which is affixedly mounted a "C" shaped, annular trackway 102. The trackway 102 is cross-shaped in cross-section (note FIG. 3), and includes a vertical section 103 which carries a horizontal section 104. Stop plates 105A, 105B are located at the ends of the "C" shaped, annular trackway 102 to limit the amount of travel on the trackway, and the stop plates 105A, 105B are separated from each other by an arcuate gap "G".

As can best be seen in FIG. 1, the generally "C" shaped base plate 101 defines an open, side, entry and exit area 106 having a width "W" which leads into the centrally located, object cutting area 107, which lies at the operative center of the cutter system. The entry/exit area 106 is always open to the exterior and to the central cutting area 107, allowing for easy, unimpeded entry and exit of the object being cut, for example a pipe casing, into the cutter assembly system 100/200.

To properly position and centrally locate the pipe casing to be cut at the center 107, two generally opposed, spring loaded pipe clamp cylinders 108A,108B are located on the upper side of the base plate 101. Associated with them and centrally positioned between them is a generally opposed, removeable pipe guide centering member 109. When the pipe casing to be cut is at least generally located in the central, cutting area 107, the pipe clamp cylinders 108A,108B are activated pushing and clamping the pipe against the curved, back wall stop 110 of the fixed centering member 109 exactly centering the pipe within the cutter. The rams 111A,111B contact the pipe below the cut line (note FIG. 2).

The centering member 109 is bolted on the base plate 101 and has a curved back wall 110 mated to the diameter of the pipe to be cut. For cutting of significantly different diameter pipes, the centering member 109 can be removed and replaced with a differently curved but otherwise like centering member.

When the cutting of the pipe is complete, the pipe clamp cylinders 108A,108B are de-activated, and their rams 111A,111B retract under the action of their internal biasing springs, allowing the cutter system to be easily removed.

Mounted for annular or circular movement on the trackway 102 is the moveable, cutter sub-assembly 200, shown in its neutral or zero degree/three hundred sixty degree position in FIGS. 1 and 2. The cutter sub-assembly 200 includes two, opposed, driven, rotatable cutter blades 201A, 201B, which, when the cutter system is in its operative mode, cuts the pipe or other object located in the central cutting area 107. The cutter blades 201A, 201B are driven by pneumatic cutter motors 202A, 202B, respectively.

Structurally, the cutter sub-assembly 200 includes a base section 203, carrying two, moveable, cutter arms 204A, 204B upon which the cutter motors 202A, 202B and cutter blades 201A, 201B are mounted. The structural members 203, 204A and 204B themselves form a "U" shaped structure, as best can be seen in FIG. 1, for straddling the centrally located cutting area 107.

The cutter arms 204A, 204B are moveably mounted on the base element 203 by means of pivot pins 205A, 205B, respectively, which allows the cutter blades 201A, 201B, to be moved further inwardly towards the cutter area 107 during the cutting operation and to be moved outwardly from the cutter area 107 after cutting is complete. The cutter arms 204A,204B are moved about their pivot pins 205A,205B by a single yoke 206 which is connected to the arms by means of connecting links 207A, 207B, all of which are pinned together. The yoke 206 is in turn driven by an air cylinder 208 for reciprocal movement, which in turn due to the geometry of the connections and linkages causes the pivotable, radially opposed movements of the cutter blades 201A,201B toward and away from each other. The foregoing described elements can be seen in phantom line in FIG. 1 and in detail in FIG. 6.

The base, structural support member 203, which carries the rest of the cutter sub-assembly 200, has on its underside two, spaced support wheel assemblies 209A, 209B for mounting the cutter sub-assembly 200 on to the trackway 102 for annular movement over the basic assembly body 100. Each wheel assembly, for example wheel assembly 209A, includes a vertically, downwardly disposed support bar 210A fixedly attached to the underside of the base member 203. The support bar 210A carries lower and upper rollers 211A,212A, which are mounted for rotation about horizontally disposed axes (note FIG. 2), with a like wheel assembly 209A', comprising like elements 210A',211A',212A', being located on the other side of the vertical track member 103 of the trackway 102 (note FIGS. 1 and 3). These four, horizontally disposed rollers 211A,212A/211A',212A' ride on the horizontally disposed track element 104 of the trackway 102.

Additionally, each wheel assembly, for example, 209A, includes two, opposed, vertically disposed rollers 213A,213A' located on opposite sides of the vertical track element 103, and these vertical rollers ride on the vertical track element 103 of the trackway 102.

Also mounted on the underside of the base member 203 is the cutter sub-assembly drive motor 214 which rotatably drives a vertically disposed drive roller 215 which frictionally engages the inner, vertical, side edge 104' of the horizontal track member 104 of the cutter assembly body 100. The drive motor 214 can drive the roller in both directions, clockwise and counterclockwise, causing the moveable cutter sub-assembly 200 to be driven back and forth along the trackway 102 to either side of its neutral, zero degree/three hundred sixty degree position shown in FIG. 1. When the drive roller 215 is driven in the clockwise direction (as viewed from the perspective of FIG. 1), the cutter sub-assembly 200 with its cutter blades 201A,201B are driven counterclockwise about the center 107 until the "dead end" stop plate 105A is contacted or until the drive roller 215 is reversed by the motor 214 to rotate in the counterclockwise direction, driving the cutter sub-assembly in the clockwise direction until the other, "dead-end" stop plate 105B is engaged.

In the embodiment illustrated in FIG. 1, it is noted that the geometry and structure of the cutter system causes the cutter sub-assembly 200 to be moved one hundred ten degrees in each direction, that is, using the position of the drive roller 215 illustrated in FIG. 1 as the zero/three hundred sixty degree position, the drive roller 215 moves from a position of zero degrees to minus one hundred ten degrees (two hundred fifty degrees) in its downward, counterclockwise sweep, and from zero degrees up to one hundred ten degrees in its upward, clockwise sweep, for a total movement of two hundred twenty degrees. The directly opposed, cutter blades 201A,201B, separated from each other by an arcuate distance of one hundred eighty degrees, effectively occupy the position of two hundred seventy degrees and ninety degrees, respectively, in their positions illustrated in FIG. 1. During the complete, alternating, back and forth sweeps of the cutter sub-assembly 200, the cutter blade 201A will move from the one hundred sixty degree position through and to the three hundred eighty degree position (twenty degree), a total of two hundred twenty degrees; while the blade 201B will move from the minus twenty degree position (three hundred forty degree) through and to the two hundred degree position, for a like total of two hundred twenty degrees of sweep. The blades 201A,201B thus in their total movement cover the complete three hundred sixty degrees about the cutting area 107 with some eighty degrees of overlapping of the cuts to insure a good cut of the pipe casing or other object to be cut located in the central cutting area 107. It is of course necessary that the two cutters 201A,201B travel at least one half their arcuate separation distance, that is, at least ninety degrees, in order for their respective cuts to meet to form a three hundred sixty degree cut, and preferably at least a little bit more to insure that the respective cuts join and are complete.

It is possible to use more than two cutter blades, for example, three blades, or four blades, etc. In the instance of three blades, the blades would preferably be positioned, with the center one positioned at zero degrees/three hundred sixty degrees and the two flanking blades positioned at one hundred twenty degrees and two hundred forty degrees (minus one hundred twenty degrees), with their minimum arcuate travel distance being no less than plus-or-minus sixty degrees, plus preferably at least a little bit more to insure a complete cut. In order to preferably eliminate any over surplus of overlap, the three blades should travel less than plus-or-minus one hundred twenty degrees.

For a four blade embodiment, in the central, neutral disposition, the blades would preferably be located at forty-five degrees, one hundred thirty-five degrees, two hundred twenty-five degrees, and three hundred fifteen degrees (minus forty-five degrees), with their minimum required travel distance being plus-or-minus forty-five degrees, preferably plus at least a little bit more to insure a complete cut. In order to eliminate any over surplus of overlap, the blades should travel less than ninety degrees either way.

Of course, under some circumstances, it might be desirable to have the blades totally overlap the cuts of the other blades, particularly where many passes of the blades are needed to cut through the pipe wall, but this situation is generally not preferred. However, in such an instances, for example in a four blade embodiment, each blade could travel plus or minus ninety degrees which would result in a double cut for each complete, back-and-forth, cyclical pass of the cutter assembly.

However, for simplicity of the structure and maximum economy in cost, the two blade embodiment illustrated is preferred with the blades being directly opposed and located when in the neutral disposition at ninety degrees and two hundred seventy degrees as illustrated in FIG. 1, with the zero degree position being the left-hand portion of the center line of the cutter body passing thru the center point 107 and bisecting the entry are "W" and the trackway gap "G." The cutters would also always have to travel at least one-half of the arcuate trackway gap distance "G."

Figure 3:
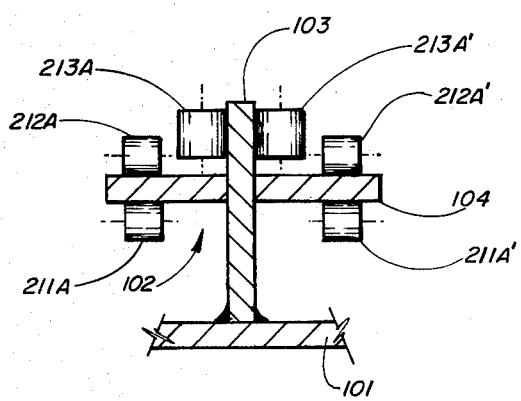

As can best be seen in FIGS. 2 and 3, the cutter system preferrably includes a boom section 300, including two telescoping, structural members 301,302. The relatively fixed structural member 301 can be attached to for example a working vehicle such as a tractor, backhoe, etc., with the telescopic section 302 which carries the operative elements of the cutter system moveable in and out under the control of the operator. The base plate 101 of the cutter assembly body 100 is attached to the structural boom member 302 by means of a lateral, horizontally disposed pivot pin 303. The pivoting of the cutter assembly body 100 about the pivot pin 303 is controlled by the pneumatically actuated tilt cylinder 304 mounted on the structural boom member 302 and connected to the cutter assembly body 100 by means of the piston rod 305 (note FIG. 2). The movement in of the piston rod 305 causes the cutter assembly body 100 to be pivoted up about the pivot pin 303.

Mounted on the upper portion of the boom member 301 is an inverted, "U" shaped support structure 306 which in its upper area 306' carries and supports a longitudinally moveable water line 401, whose nozzle is directed towards the moveable cutter sub-assembly 200. The water line 401 is driven back and forth in its longitudinal position as desired by pneumatic motor 307 which engages a rack 402 on the water line 401.

At the lower portion 306" of the support structure 306 is a channel 310 for the various pneumatic and water lines 403, 404, 405, 406 and 407 which are used to operate various parts of the cutter system. As can best be seen in FIG. 4, the lower portion 306" of the support structure 306 carries one free wheeling, horizontally disposed roller 308 and two free wheeling, vertically disposed rollers 309A and 309B which define three sides of the channel 310 through which the five pneumatic/water lines pass as the boom member 302 telescopes in and out of the boom member 301.

Pneumatic lines 311, 312 are used to drive the pneumatic motor 307, while pneumatic line 313 is used to drive the piston 305 of the cylinder 304 back to tilt up the cutter assembly body 100.

Figure 5:
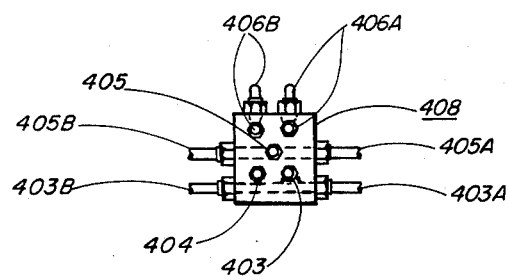
Figure 4:
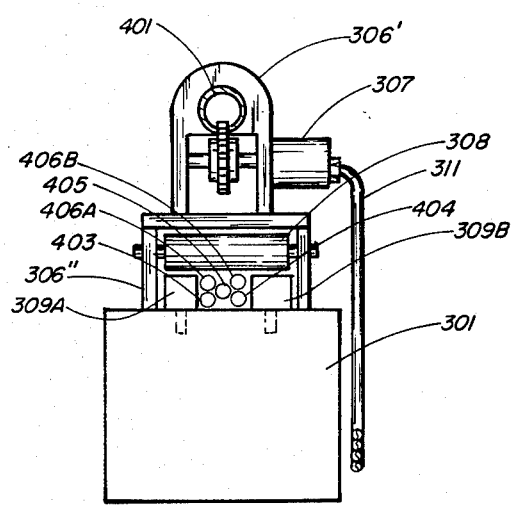
Figure 6:
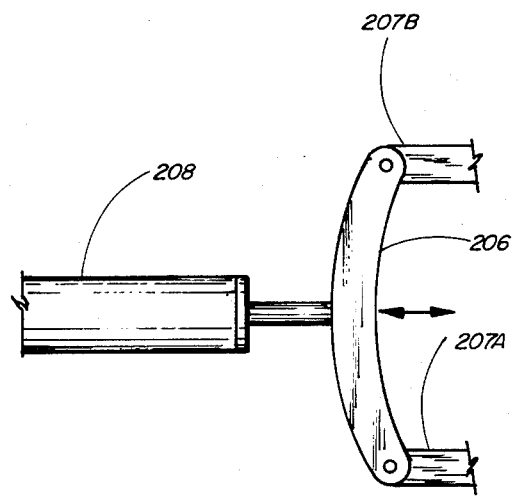

As can best be seen in FIGS. 2 and 5, the pneumatic/water lines 403–407 are connected to a distributor block 408 mounted at the rear of the reciprocating cylinder drive 208 used to radially position the rotatable cutter blades 201A, 201B. Air line 403 goes to a T-connection in distributor block 408 to connecting lines 403A, 403B to the drive motors 202A, 202B, respectively. Pneumatic air line 404 extends straight through the distributor block 408 to the back side of the opening and closing cylinder 208 which radially positions inwardly and outwardly the cutter blades 201A, 201B. Water line 405 is connected through a T-connector in the distributor block 408 into the water lines 405A, 405B which spray water from right above the cutter blades 201A, 201B onto the area and object being cut for cooling purposes. Pneumatic lines 406A, 406B go through distributor block 408 through to the upper side to the sub-assembly drive motor 214 for causing the cutter sub-assembly 200 to be driven back and forth during the cutting operation.

Pneumatic line 407 is connected to a T-connector associated with the vertical track element 103 and the base plate member 101 which in turn branches into the pneumatic lines 407A, 407B to the spring loaded pipe clamp cylinders 108A, 108B.

Of course, if desired, some or all of the pneumatic subsystems could be replaced with equivalent hydraulic systems.

The telescoping boom 300 can be for example thirty-five to seventy-five feet in length connected through its structural member 301 to a working vehicle, with all the controls and pneumatic and water supplies mounted on the vehicle. This allows the cutter system to be controlled preferrably from a distance so that it can be used even in a fire or other emergency situation. In this regard it is noted that the water lines 401, 403A, 403B not only cool all of the elements of the system, but also serve as spark arrestors. It is also noted that the cutter system can be used to cut both the outer pipe casing as well as any inner pipes.

It should be clear from the foregoing disclosure that the cutter system of the present invention can be quickly and easily put into operation for cutting a number of different, spaced pipe casings. The work vehicle need only to generally move into position and, with the use of the telescoping boom 300, position the cutter assembly body about the pipe casing to be cut with the pipe casing having easy entry through the entry area 106 to the centrally located cutting area 107. The cutter assembly body 100, if need be, can then be tilted down about pivot axis 303 by releasing the pivot or tilt cylinder 304.

The spring loaded pipe clamp cylinders 108A, 108B are then actuated through pneumatic lines 407A, 407B, automatically centering the pipe to be cut against the centering member 109. The high speed pneumatic motors 202A, 202B (which can be for example six thousand plus r.p.m. motors) are actuated driving the cutter blades 201A, 201B (which can typically be ten inch diameter blades) which are moved radially inwardly into the pipe casing to be cut by means of the positioning or opening/closing, spring loaded cylinder 208 through pneumatic line 404. Concurrently the drive motor 214 is actuated, causing the cutter sub-assembly 200 to be driven back and forth through its arc on the exemplary two hundred ninety degree trackway 102.

During the foregoing operations and the cutting of the pipe casing, the water lines 401, 405A, 405B are used to cool the system during use and as spark arrestors.

After completion of the cutting operation on the pipe casing, pressure is relieved on the positioning cylinder 208 through line 404, allowing the cutter blades to move radially out under the biasing spring action of the internal spring in cylinder 208. The pipe clamp cylinders 108A, 108B are deactivated, allowing the telescopic boom to be shortened or to be further extended to any internal pipes needing cutting, or for removal of the cutter system to the next location.

Although having the cutter attached through a boom to a work vehicle is preferred in many situations, in other circumstances it may be desirable to mount the cutter on a saddle attached to a crane, etc., for working at greater heights, etc.

Because many varying and different embodiments may be made within the scope of the inventive concept herein taught, and because many modifications may be made in the embodiment herein detailed in accordance with the descriptive requirements of the law, it is to be understood that the details herein are to be generally interpreted as illustrative and not in a limiting sense.

What is claimed is:

1. A cutter system for an object having a wall to be cut which is generally circular in cross-section, such as pipe casings and the like, comprising:
    an annular shaped object encircling assembly defining a centrally located object cutting area and having a basic assembly body; said body defining an open side entry area means having a predetermined width between respective ends of said basic body for allowing entry and exit of the object into and from said basic body without any supplemental opening and closing action, respectively, of said body;
    an annular shaped trackway fixedly mounted on said basic body and extending substantially around the object cutting area and terminating at two ends adjacent said side entry area means thereby forming a gap having an arcuate distance between the ends of the trackway;
    at least two, spaced, moveable cutter means forming an arcuate separation distance for cutting the object located in the object cutting area about three hundred and sixty degrees of the object's periphery, said at least two cutter means being mounted on said trackway by track mounting means, said track mounting means traveling along said trackway around the object cutting area a distance equal to at least one-half of their arcuate separation distance plus at least one-half said gap arcuate distance with said cutter means in cutting engagement with the object on one side of a midpoint of said trackway and a distance equal to at least one half of their arcuate separation distance on the other side of said midpoint of said trackway, producing a total of at least three hundred sixty degrees of cut.

2. The cutter system of claim 1, wherein said cutter means are mounted together on a cutter sub-assembly which in turn is mounted on said trackway, and are fixed in their separation distance all in common movement together on said trackway.

3. The cutter system of claim 2, wherein there are exactly two cutter means spaced one hundred and eighty degrees apart.

4. The cutter system of claim 3, wherein said cutter sub-assembly includes track mounting means for moving said cutter sub-assembly back and forth in excess of one hundred and eighty degrees.

5. The cutter system of claim 1, wherein said moveable cutter means includes track mounting means for traveling less than the arcuate separation distance of said moveable cutter means.

6. The cutter system of claim 1, wherein there is further included:
    a boom section, including at least two telescoping, structural members, said basic assembly body being carried by one of said telescoping structural members and connected thereto through a pivoting connection means for permitting pivotting movement of said basic body assembly and hence said cutter means about said boom section.

7. The cutter system of claim 1, wherein there is further included:
    positioning means on said basic assembly body for positioning and centrally locating the object to be cut in the object cutting area, said positioning means including at least two circularly faced clamp means for engaging and holding the object to be cut between them, one of which is moveable toward the other.

8. The cutter system of claim 7, wherein there are three circularly faced clamping means, the center one of which is located mid-way between the other two and between said two, spaced, moveable cutter means.

9. The cutter system of claim 1, wherein there is further included:
   liquid spray means on said basic body assembly for spraying liquid into the area of the object being cut as it is being cut.

* * * * *